United States Patent
Choi

(10) Patent No.: US 7,602,585 B2
(45) Date of Patent: Oct. 13, 2009

(54) ACTUATOR FOR A DISK DRIVE HAVING A SUSPENSION ASSEMBLY INCLUDING A FLEXURE OF A MONOLITHIC STRUCTURE AND A LIMITER

(75) Inventor: Byoung-gyou Choi, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 757 days.

(21) Appl. No.: 10/988,582

(22) Filed: Nov. 16, 2004

(65) Prior Publication Data

US 2005/0157428 A1  Jul. 21, 2005

(30) Foreign Application Priority Data

Jan. 19, 2004  (KR) .................... 10-2004-0003805

(51) Int. Cl.
*G11B 5/55* (2006.01)

(52) U.S. Cl. .................................. 360/245.7
(58) Field of Classification Search ............... 360/245.7
See application file for complete search history.

(56) References Cited

U.S. PATENT DOCUMENTS

| | | | |
|---|---|---|---|
| 5,930,079 A | 7/1999 | Vera et al. |
| 6,067,209 A | 5/2000 | Aoyagi et al. |
| 6,172,853 B1 | 1/2001 | Davis et al. |
| 6,243,235 B1 | 6/2001 | Fu et al. |
| 6,388,843 B1 | 5/2002 | Takagi et al. |
| 6,424,498 B1 | 7/2002 | Patterson et al. |
| 6,445,546 B1 | 9/2002 | Coon |
| 6,462,911 B1 * | 10/2002 | Tokuyama et al. ....... 360/245.7 |

FOREIGN PATENT DOCUMENTS

| | | |
|---|---|---|
| JP | 2000-076810 | 3/2000 |
| JP | 2000-298966 | 10/2000 |
| JP | 2002-117639 | 4/2002 |

OTHER PUBLICATIONS

Korean Office Action dated Jul. 25, 2005, corresponds to Korean Patent Application No. 2004-0003805.
European Search Report for European Application No. EP05000401.9-2210 dated Aug. 16, 2006 (in English).
Japanese Office Action for corresponding Japanese Patent Application No. 2005-011931 dated Oct. 17, 2006.

* cited by examiner

*Primary Examiner*—A. J. Heinz
(74) *Attorney, Agent, or Firm*—Staas & Halsey LLP

(57) ABSTRACT

A suspension assembly has a flexure limiter and an actuator of a disk drive adopting the flexure limiter. The suspension assembly elastically biases a slider toward a surface of a disk, in which a read/write head is mounted on the slider. In the suspension assembly, a load beam is coupled to an end portion of a swing arm of the actuator and has sidewalls bent along both outside edges thereof. A flexure supports the slider and has a rear end portion fixed to a disk facing surface of the load beam and a front end portion extended toward a front end portion of the load beam. A flexure limiter is bent from the front end portion of the flexure toward the load beam to face a surface opposite to the disk facing surface of the load beam, thus limiting a range of pitching and rolling movements of the flexure.

18 Claims, 4 Drawing Sheets

ACTUATOR FOR A DISK DRIVE HAVING A SUSPENSION ASSEMBLY INCLUDING A FLEXURE OF A MONOLITHIC STRUCTURE AND A LIMITER

CROSS-REFERENCE TO RELATED APPLICATIONS

This application claims the priority of Korean Patent Application No. 2004-3805, filed on Jan. 19, 2004, in the Korean Intellectual Property Office, the disclosure of which is incorporated herein in its entirety by reference.

BACKGROUND OF THE INVENTION

1. Field of the Invention

The present invention relates to a disk drive, and more particularly, to a suspension assembly for to support a slider, on which a read/write head is mounted, and to an actuator for moving the read/write head to a predetermined position of a disk.

2. Description of the Related Art

As one of the information storage devices of a computer, the hard disk drive (HDD) is a device for to reproduce/record data from/on a disk using a read/write head.

Such a hard disk drive includes an actuator to move a read/write head to a predetermined position of a disk. The actuator is provided with: a swing arm; a suspension assembly installed in one end portion of the swing arm to bias, elastically, a slider toward a surface of the disk, in which the read/write head is mounted on the slider; and a voice coil motor (VCM) to rotate the swing arm.

If the hard disk drive is powered on and the disk starts to rotate, the voice mail motor rotates the swing arm to move the slider over a recording surface of the disk. The read/write head mounted on the slider functions to reproduce or record data from/on the recording surface of the disk.

Meanwhile, if the hard disk drive does not operate, that is, if the disk is stopped, the voice coil motor moves and parks the read/write head out of the recording surface of the disk to prevent the read/write head from colliding against the recording surface of the disk. Generally, such head parking systems may be classified into a contact start stop (CSS) system and a ramp loading system. In the CSS system, a parking zone in which data is non-recordable is provided in an inner circumference of the disk and the head is parked in contact with the parking zone. In the ramp loading system, a ramp is installed outside the disk, and the head is parked on the ramp.

FIG. 1 is an exemplary view showing a conventional suspension assembly of an actuator for a disk drive, which is disclosed in U.S. Pat. No. 6,067,209. Referring to FIG. 1, two suspension assemblies are arranged on both sides of a disk 21. One end portion of a flexure 29 is attached to a load beam 28 of the suspension assembly and a slider 30 is attached to the flexure 29 using an adhesive agent. An end-tab 28a is extendedly formed on a front end portion of the load beam 28. The end-tab 28a is supported in contact with a surface of a ramp 24. A first limiter 37 is provided on a front end portion of the flexure 29 and a block member 27 is provided on the ramp 24. In addition, a second limiter 29a is provided between the front end and rear end portions of the flexure 29. The second limiter 29a extends through an aperture 31, which is formed on the load beam 28.

If a vertical shock is applied to the conventional suspension assembly constructed as above, the first limiter 37 contacts with the block member 27 of the ramp 24 and the second limiter 29a is engaged with the load beam 28. Therefore, a movement of the flexure 29 in the pitching direction is limited, thus preventing collision of the sliders 30, which face each other.

Since the first limiters 37 are, however, disposed very close to the sliders 30, the first limiter 37 may collide robustly against the block member 27 if a relatively strong shock is applied to the conventional suspension assembly. The shock is directly transferred to the slider 30, such that the sliders 30 are frequently separated from the flexures 29.

Meanwhile, a crash stop is provided in the disk drive to limit the clockwise and counterclockwise rotation of the actuator. If a horizontal shock is applied robustly to the actuator from the outside in operation of the disk drive, or if a horizontal shock is applied to the actuator due to a collision with the crash stop in a reliability test of the disk drive, the flexures 29 are moved or twisted in the rolling direction. Thus, the sliders 30 may collide against the surface of the disk 21. As a result, the head and the disk 21 may be damaged, or a deformation may be caused, resulting in degradation in read/write performance of the head.

In the conventional suspension assembly, the first and second limiters 37 and 29a may cope with the vertical shock, but cannot effectively cope with the horizontal shock and the resultant twisted deformation of the flexures 29.

FIG. 2 is an exemplary view showing a conventional suspension assembly of an actuator for a disk drive, which is disclosed in U.S. Pat. No. 6,388,843. Referring to FIG. 2, a limiter 70 to limit a movement of a flexure 52 in the pitching direction is provided on both sides of a front end portion of a load beam 51. However, the limiter 70 of the suspension assembly also cannot limit a movement of the limiter 70 in the rolling direction, which is problematic.

Meanwhile, U.S. Pat. No. 6,445,546 discloses a suspension assembly, in which slots are formed on a load beam and tabs bent from a flexure are inserted into the slots. In such a structure, however, an area where a slider is attached to the flexure becomes narrower due to the tabs. Therefore, the slider may be easily separated from the flexure due to an external shock. Further, the assembling process becomes difficult because the tabs must be bent after their insertion into the slots.

SUMMARY OF THE INVENTION

The present invention provides a suspension assembly and an actuator for a disk drive adopting the same, which are capable of preventing a deformation of a flexure and a damage of a head, caused by vertical and horizontal shock applied to the actuator.

According to an aspect of the present invention, a suspension assembly of an actuator for a disk drive elastically biases a slider toward a surface of a disk, and a read/write head is mounted on the slider. The suspension assembly includes: a load beam coupled to an end portion of a swing arm of the actuator, the load beam having sidewalls bent along both edges thereof; a flexure which supports the slider, the flexure having a rear end portion fixed to a disk facing surface of the load beam and a front end portion extended toward a front end portion of the load beam; and a flexure limiter bent from the front end portion of the flexure toward the load beam to face a surface opposite to the disk facing surface of the load beam, thus limiting a range of pitching and rolling movements of the flexure.

The flexure limiter may be formed close to both edges of the front end portion of the flexure. The flexure limiter includes: a vertical portion bent from the front end portion of the flexure in a vertical direction; and a horizontal portion bent from an end portion of the vertical portion in a horizontal direction to face the surface opposite to the disk facing surface of the load beam. A first gap is formed between the horizontal portion of the flexure limiter and the load beam in a vertical direction, and a second gap is formed between the horizontal portion of the flexure limiter and the sidewall in a horizontal direction.

According to another aspect of the present invention, an actuator for a disk drive includes: a swing arm pivotally mounted on a base member of the disk drive; a suspension assembly to bias, elastically, a slider toward a surface of a disk, a read/write head to reproduce and/or record data being mounted on the slider; and a voice coil motor to rotate the swing arm to move the read/write head to a predetermined position of the disk. The suspension assembly comprises: a load beam coupled to an end portion of the swing arm of the actuator, the load beam having sidewalls bent along both edges thereof; a flexure which supports the slider, the flexure having a rear end portion fixed to a disk facing surface of the load beam and a front end portion extended toward a front end portion of the load beam; and a flexure limiter bent from the front end portion of the flexure toward the load beam to face a surface opposite to the disk facing surface of the load beam, thus limiting a range of pitching and rolling movements of the flexure.

According to the present invention, in addition to the pitching and rolling movements of the flexure due to the shock applied to the actuator, the twist of the flexure may be limited below a predetermined level. Thus, it is possible to prevent the deformation of the flexures and the damage of the heads, which are caused by the shock applied to the actuator, thus improving reliability in the operation of the disk drive.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

The above and other features and advantages of the present invention will become more apparent by describing in detail exemplary embodiments thereof with reference to the attached drawings in which.

DETAILED DESCRIPTION OF THE PREFERRED EMBODIMENTS

Figure 1:
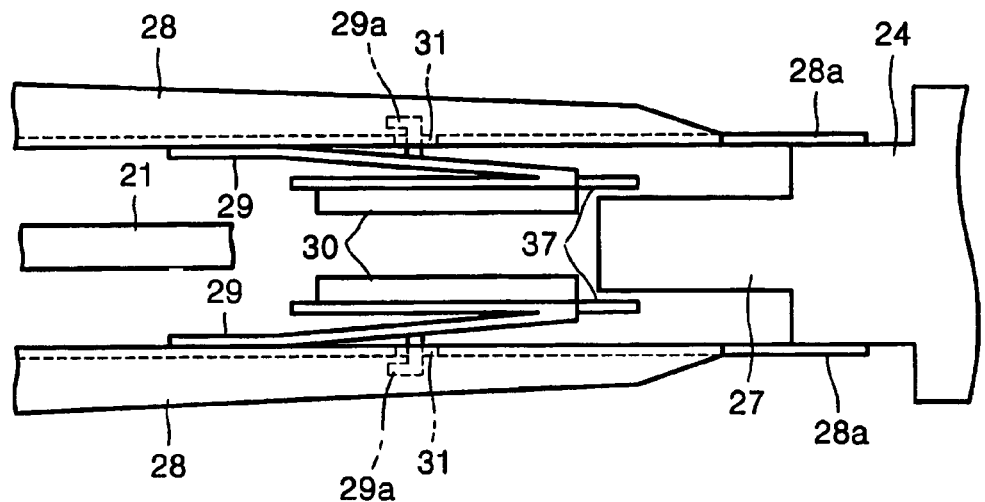
FIG. 1 is a side view illustrating one example of a conventional suspension assembly of an actuator for a disk drive.
Figure 2:
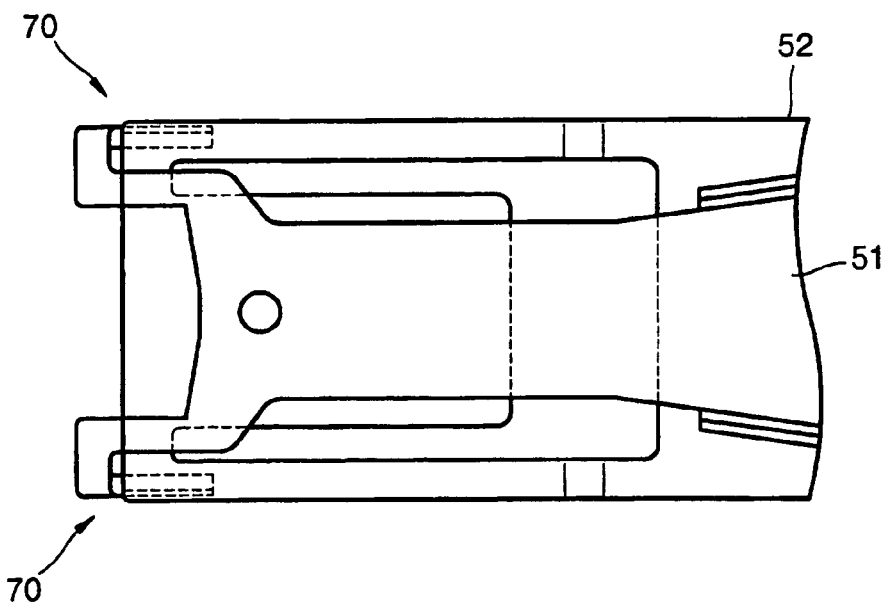
FIG. 2 is a side view illustrating another example of a conventional suspension assembly of an actuator for a disk drive.

Reference will now be made in detail to the embodiments of the present invention, examples of which are illustrated in the accompanying drawings, wherein like reference numerals refer to the like elements throughout. The embodiments are described below to explain the present invention by referring to the figures.

The present invention will now be described more fully with reference to the accompanying drawings, in which exemplary embodiments of the invention are shown. The invention may, however, be embodied in many different forms and is not to be construed as being limited to the embodiments set forth herein; rather, these embodiments are provided so that this disclosure will be thorough and complete, and will fully convey the concept of the invention to those skilled in the art. In the drawings, the thickness of layers and regions are exaggerated for clarity.

Figure 3:
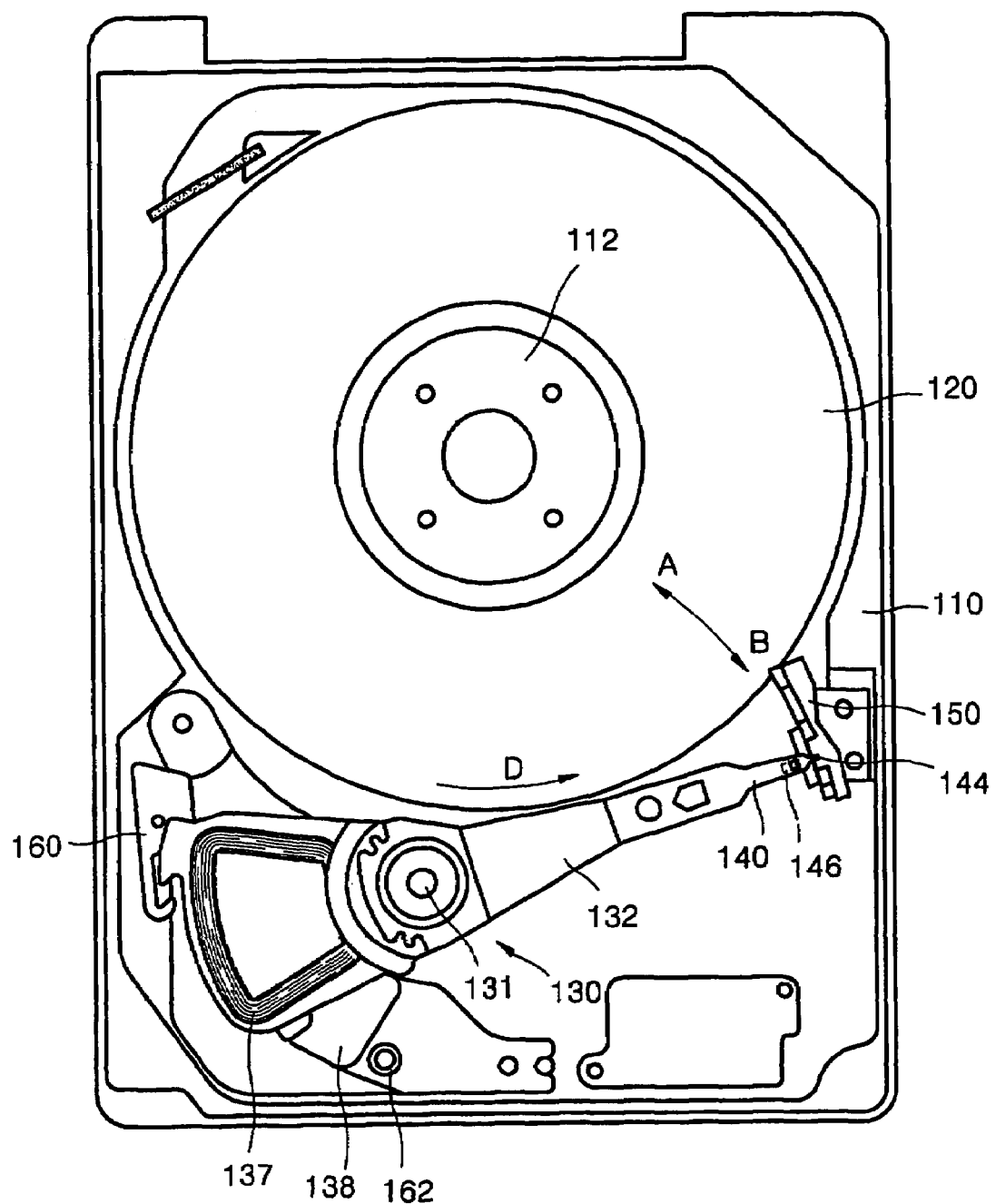
FIG. 3 is a plan view schematically illustrating a structure of a hard disk drive, which adopts a suspension assembly of an actuator according to an embodiment of the present invention.

FIG. 3 is a plan view schematically illustrating a structure of a hard disk drive, which adopts a suspension assembly of an actuator according to an embodiment of the present invention. Referring to FIG. 3, the hard disk drive includes: a spindle motor 112 mounted on a base member 110; one or more disks 120 fixedly installed in the spindle motor 112; and an actuator 130 to move a read/write head (not shown) to a predetermined position of the disk 120. Here, the read/write head is a device to reproduce and/or record data from/on the disk 120.

The actuator 130 includes: a swing arm 132 pivotally mounted on a pivot bearing 131 that is installed in the base member 110; a suspension assembly 140 installed in one end portion of the swing arm 132 to bias the slider 146 elastically toward a surface of the disk 120, in which the head is mounted on the slider 146; and a voice coil motor (VCM) to rotate the swing arm 132.

The voice coil motor is provided with a VCM coil 137 coupled to the other end portion of the swing arm 132 and a magnet 138 arranged to face the VCM coil 137. The voice coil motor constructed as above is controlled by a servo control system. The voice coil motor rotates the swing arm 132 in a direction based on Fleming's left hand rule by an interaction between current inputted to the VCM coil 137 and magnetic field induced by the magnet 138.

Particularly, if the hard disk drive is powered on and the disk 120 starts to rotate in a direction indicated by an arrow D, the voice coil motor rotates the swing arm 132 in a counter-clockwise direction indicated by an arrow A, such that the slider 146 on which the read/write head is mounted are moved over a recording surface of the disk 120. The slider 146 lifts up from a surface of the disk 120 to a predetermined height by a lift force, which occurs due to the rotating disk 120. In this state, the read/write head mounted on the slider 146 functions to reproduce and/or record data from/on the recording surface of the disk 120.

Meanwhile, if the hard disk drive is powered off and the disk 120 is stopped, the voice coil motor rotates the swing arm 132 in a clockwise direction, indicated by an arrow B, to prevent the head from colliding against the recording surface of the disk 120, such that the read/write head is moved and parked out of the recording surface of the disk 120. For this purpose, a ramp 150 is installed outside the disk 120 and an end-tab 144 is provided in the suspension assembly 140. The end-tab 144 is moved from the disk 120 to the ramp 150, and then is supported by the ramp 150.

In the state that the read/write head is parked on the ramp 150, the actuator 130 may be rotated arbitrarily due to external shock or vibration applied to the disk drive and may break away from the ramp 150, thus moving toward the recording surface of the disk 120. In this case, the head may contact the recording surface of the disk 120, resulting in damage to the head and the recording surface of the disk 120. Accordingly, in the state that the disk 120 is stopped and the head is parked on the ramp 150, the actuator 130 needs to be locked to a predetermined position to prevent it from being rotated arbitrarily. For this purpose, an actuator latch 160 is provided.

When the actuator 130 is rotated in a counterclockwise direction by the voice coil motor, the actuator latch 160 also acts as a crash stop, which prevents the end-tab 144 from escaping from the ramp 150. Meanwhile, the disk drive includes an additional crash stop 162, which limits a counterclockwise rotation of the actuator 130 to prevent the suspension assembly 140 from colliding against the spindle motor 112 when the actuator 130 is rotated in a counterclockwise direction by the voice coil motor.

Figure 4:
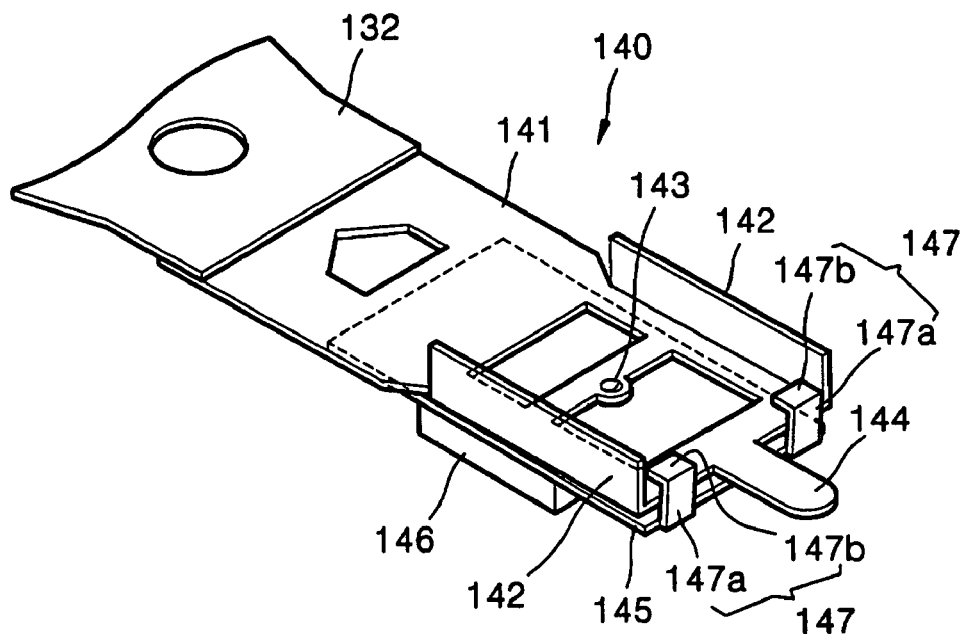
FIG. 4 is a perspective view of the suspension assembly of FIG. 3 according to an embodiment of the present invention.
Figure 5:
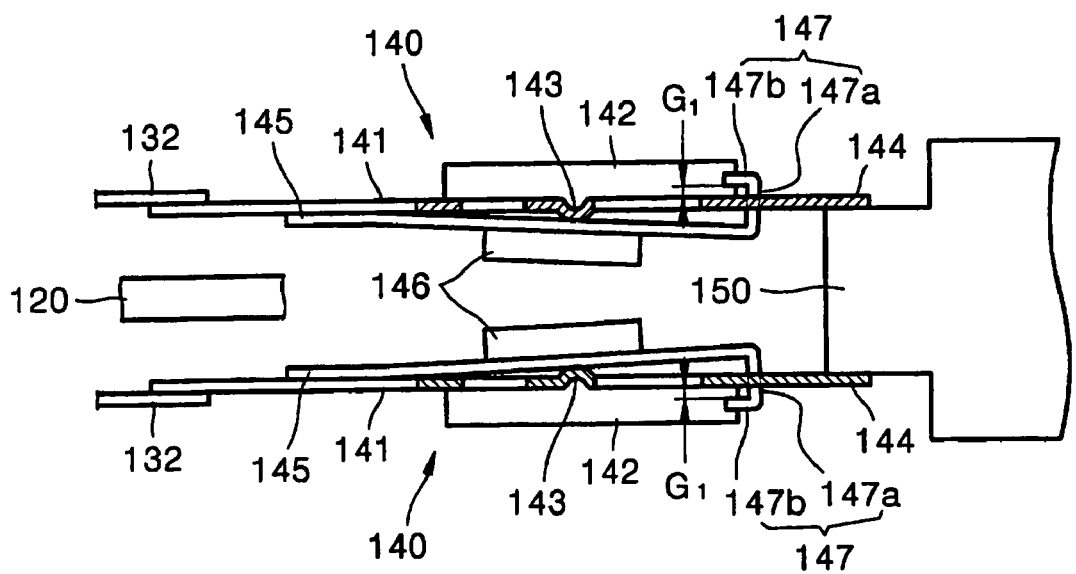
FIG. 5 is a side view of the suspension assembly of FIG. 4.
Figure 6:
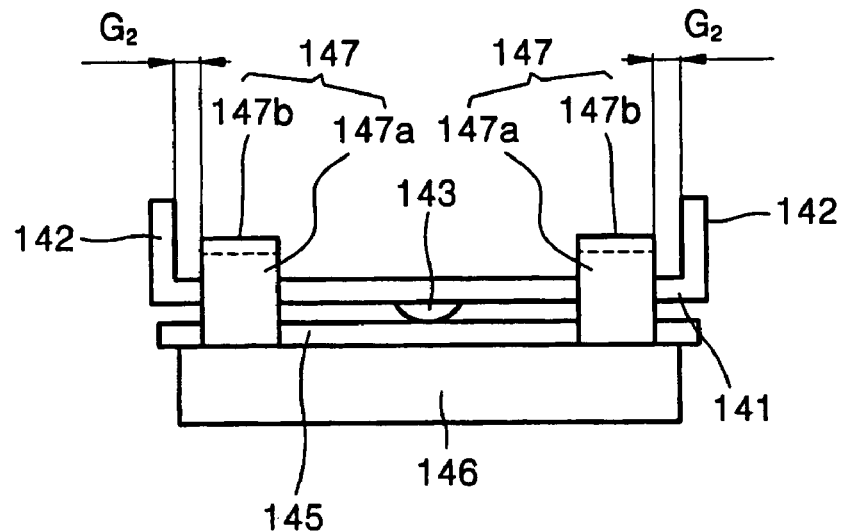
FIG. 6 is a front view of the suspension assembly of FIG. 4.
Figure 7:
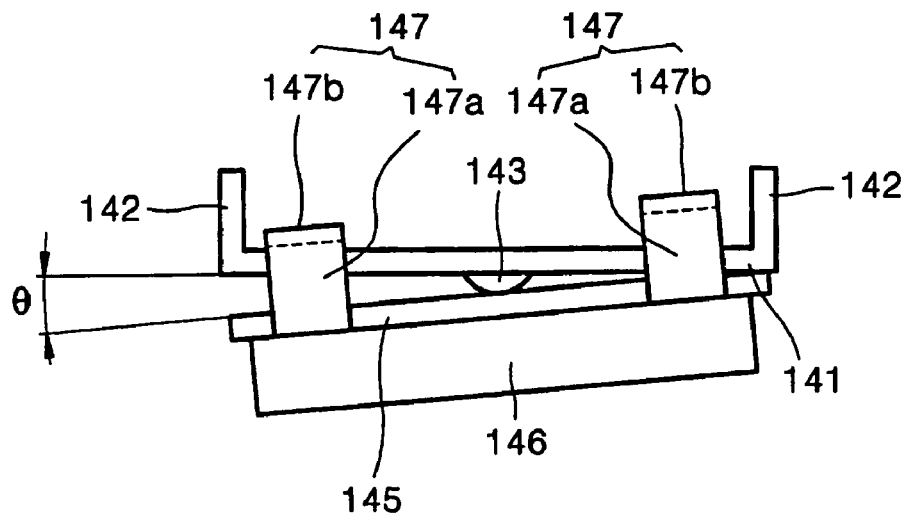
FIG. 7 is a view illustrating an operation of a flexure limiter with respect to a twist of the flexure in the suspension assembly of FIG. 4.

FIG. 4 is a perspective view of the suspension assembly of FIG. 3 according to an embodiment of the present invention, and FIG. 5 is a side view of the suspension assembly of FIG. 4. FIG. 6 is a front view of the suspension assembly of FIG. 4, and FIG. 7 is a view illustrating an operation of a flexure limiter with respect to a twist of the flexure in the suspension assembly of FIG. 4.

Referring to FIGS. 4 through 6, the suspension assembly 140 according to an embodiment of the present invention is provided in the actuator 130 and functions to elastically bias the slider 146 toward the surface of the disk 120. Here, the read/write head is mounted on the slider 146.

The suspension assembly 140 includes a load beam 141, a flexure 145 and a flexure limiter 147. The flexure limiter 147 limits the pitching and rolling movements of the front end portion of the flexure 145 within a predetermined range.

The load beam 141 is coupled to an end portion of the swing arm 132 of the actuator 130. The load beam 141 is generally made by pressing a metal plate, such as stainless steel, which has a thin thickness of, for example, about 0.05 mm. To increase stiffness of the load beam 141, sidewalls 142 are formed along both edges of the load beam 141. The sidewalls 142 may be formed by bending both edges of the load beam 141 in an upward direction. In addition, the end-tab 144 to park the read/write head on the ramp 150 is provided in the load beam 141. The end-tab 144 is formed extending from the front end portion of the load beam 141 to a predetermined length.

The flexure 145 functions to support the slider 146, on which the head is mounted. The flexure 145 is attached to a bottom surface of the load beam 141, that is, a surface facing the disk 120. A rear end portion of the flexure 145 is fixed to the disk facing surface of the load beam 141 by a weld or the like. A front end portion of the flexure 145 is extended toward the front end portion of the load beam 141, such that the flexure 145 is movable somewhat freely. Like the load beam 141, the flexure 145 is made of thin stainless steel. The flexure 145, however, is formed thinner than the load beam 141, for example, about 0.02 mm thick, to permit free rolling and pitching of the slider 146 attached thereto.

A protruding dimple 143 is formed on the load beam 141 toward the flexure 145 to provide a predetermined elastic force to the flexure 145. Due to such a structure, the flexure 145 is movable freely, thus achieving the smooth rolling and pitching of the slider 146 attached to the flexure 145. As is clear from FIGS. 4 and 5, the flexure 145 is a rectilinear monomember that is a one-piece integral monolithic structure without apertures.

As described above, the suspension assembly 140 of an embodiment of the present invention includes the flexure limiter 147 to limit the pitching and rolling movements of the front end portion of the flexure 145 within a predetermined range. The flexure limiter 147 is bent from the front end portion of the flexure 145 toward the load beam 141, thus facing a surface opposite to the disk facing surface of the load beam 141. Specifically, the flexure limiter 147 may be formed close to both edges of the front end portion of the flexure 145. The flexure limiter 147 includes a vertical portion 147a bent from the front end portion of the flexure 145 in a vertical direction, and a horizontal portion 147b bent from the end portion of the vertical portion 147a in a horizontal direction. In such a flexure limiter 147, the horizontal portion 147b faces the surface opposite to the disk facing surface of the load beam 141.

A predetermined first gap $G_1$ is formed between the horizontal portion 147b of the flexure limiter 147 and the load beam 141 in a vertical direction, and a predetermined second gap $G_2$ is formed between the horizontal portion 147b and the sidewall 142 of the load beam 141 in a horizontal direction. At this time, the first and second gaps $G_1$ and $G_2$ are determined within the range between a minimum value at which the smooth rolling and pitching of the slider 146 may be secured, and a maximum value at which the deformation of the flexure 145 and the mutual collision with the adjacent slider 146 may be prevented.

If a vertical shock is applied to the suspension assembly 140 of an embodiment of the present invention, the front end portion of the flexure 145 moves in the pitching direction together with the flexure limiter 147. At this time, an upward movement of the flexure 145 is limited by the load beam 141 and a downward movement of the flexure 145 is limited because the horizontal portion 147b of the flexure limiter 147 is locked to the load beam 141. Even when an external shock is robustly applied, a range of the movement of the flexure 145 in the pitching direction is limited by the flexure limiter 147, thus overcoming the problem of the conventional suspension assembly, in which the head mounted on the slider is damaged by the mutual collision of the facing sliders, which is caused by robust movement of the flexure. In the suspension assembly 140 of an embodiment of the present invention, a distance between the flexure limiter 147 and the slider 146 is relatively elongated because the flexure limiter 147 is formed on the front end portion of the flexure 145. Accordingly, the shock transmission path from the flexure limiter 147 to the slider 146 is longer than the shock transmission path of the related art, thus preventing the slider 146 from being separated from the flexure 145 due to the external shock.

If a horizontal shock is applied to the actuator 130 from the outside in operation of the disk drive, or if a horizontal shock is applied to the actuator 130 due to a collision with the crash stop 162 in a reliability test of the disk drive, the front end portion of the flexure 145 moves in the rolling direction together with the flexure limiter 147. The rolling movement of the flexures 145, however, may be limited because the horizontal portions 147b of the flexure limiters 147 are locked to the sidewalls 142 of the load beams 141.

In addition, the twist of the flexures 145 may occur when the horizontal shock is applied to the actuator 130. Specifically, if the horizontal shock is sufficient to cause the twist amount of the flexure 145 to exceed an elastic limit, the deformation of the flexures 145 occurs. In this case, the read/write performance of the head mounted on the slider 146 is degraded.

To prevent this problem, the suspension assembly 140 of an embodiment of the present invention provides two flexure limiters 147 that are formed close to both edges of the front end portion of the flexure 145, respectively. As shown in FIG. 7, if the two flexure limiters 147 are spaced sufficiently far apart in the width direction of the flexure 145, the twist angle θ is limited to a size that is below a predetermined limit even when the flexure 145 is twisted due to the horizontal shock, thus preventing the deformation of the flexure 145. In other words, an upward movement of one end of the flexure 145 is limited by the load beam 141 and a downward movement of the other end of the flexure 145 is limited by the flexure limiter 147. Here, the twist angle θ is determined to be greater than an angle at which a smooth rolling of the slider 146 may be secured, and smaller than an angle at which the deformation of the flexure 145 occurs.

As described above, according to an embodiment of the present invention, the flexure limiter is provided on the front end portion of the flexure of the suspension assembly and may limit the twist of the flexure below a predetermined level. In addition, the pitching and rolling movements of the flexure due to the shock applied to the actuator are limited. Accordingly, even if the actuator receives a shock, the deformation of the flexures and the damage to the headsare prevented, thus improving reliability in the operation of the disk drive.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A suspension assembly of an actuator of a disk drive, which elastically biases a slider toward a surface of a disk, wherein a read/write head is mounted on the slider, the suspension assembly comprising:
    a load beam coupled to an end portion of a swing arm of the actuator, the load beam having sidewalls bent along outside edges of the load beam;
    a rectilinear monomember flexure without apertures attached to a rear end of the slider, the rectilinear monomember flexure having a rear end portion fixed to a disk facing surface of the load beam and a front end portion extended toward a front end portion of the load beam; and
    a flexure limiter bent from the front end portion of the rectilinear monomember flexure toward the load beam to face a surface opposite to the disk facing surface of the load beam, limiting a range of pitching and rolling movements of the rectilinear monomember flexure,
    wherein a dimple is formed on the load beam protruding toward the rectilinear monomember flexure to provide a predetermined elastic force to the rectilinear monomember flexure.

2. The suspension assembly of claim 1, wherein the flexure limiter is formed proximate to both edges of the front end portion of the rectilinear monomember flexure.

3. The suspension assembly of claim 1, wherein the flexure limiter includes:
    a vertical portion bent from the front end portion of the rectilinear monomember flexure in a vertical direction; and
    a horizontal portion bent from an end portion of the vertical portion in a horizontal direction to face a surface opposite to the disk facing surface of the load beam.

4. The suspension assembly of claim 3, wherein a first gap is formed between the horizontal portion of the flexure limiter and the load beam in a vertical direction, and a second gap is formed between the horizontal portion of the flexure limiter and each sidewall of the load beam in a horizontal direction.

5. The suspension assembly of claim 4, wherein the first gap and the second gap are determined within a range between a minimum value at which smooth rolling and pitching of the slider is secured and a maximum value at which a deformation of the rectilinear monomember flexure and a collision with the slider is prevented.

6. The suspension assembly of claim 1, further comprising another flexure limiter, wherein each flexure limiter is proximate to an edge of the front end portion of the rectilinear monomember flexure.

7. The suspension assembly of claim 6, wherein the two flexure limiters are spaced in a width direction of the rectilinear monomember flexure to limit a twist angle θ to a size greater than an angle at which a smooth rolling of the slider is secured and smaller than an angle at which deformation of the rectilinear monomember flexure occurs.

8. The suspension assembly of claim 6, wherein the flexure limiters are spaced sufficiently far apart in a width direction of the rectilinear monomember flexure to provide a twist angle θ that is limited to a size that is below a predetermined limit even when the rectilinear monomember flexure is twisted due to a horizontal shock.

9. The suspension assembly of claim 6, wherein the load beam limits an upward movement of an end of the rectilinear monomember flexure, and each flexure limiter limits a downward movement of another end of the rectilinear monomember flexure.

10. An actuator for a disk drive, which comprises:
    a swing arm pivotally mounted on a base member of the disk drive;
    a suspension assembly to bias, elastically, a slider toward a surface of a disk;
    a read/write head mounted on the slider to reproduce and/or record data; and a voice coil motor to rotate the swing arm to move the read/write head to a predetermined position of the disk, wherein the suspension assembly comprises:
        a load beam coupled to an end portion of the swing arm of the actuator, the load beam having sidewalls bent along both outside edges of the load beam;
        a rectilinear monomember flexure without apertures which supports the slider, the rectilinear monomember flexure having a rear end portion fixed to a disk facing surface of the load beam and a front end portion extended toward a front end portion of the load beam; and
        a flexure limiter bent from the front end portion of the rectilinear monomember flexure toward the load beam to face a surface opposite to the disk facing surface of the load beam, limiting a range of pitching and rolling movements of the rectilinear monomember flexure,
    wherein a dimple is formed on the load beam protruding toward the flexure to provide a predetermined elastic force to the rectilinear monomember flexure.

11. The actuator of claim 10, wherein the flexure limiter is formed proximate to both edges of the front end portion of the rectilinear monomember flexure.

12. The actuator of claim 11, wherein the flexure limiter includes:

a vertical portion bent from the front end portion of the rectilinear monomember flexure in a vertical direction; and a horizontal portion bent from an end portion of the vertical portion in a horizontal direction to face the surface opposite to the disk facing surface of the load beam.

13. The actuator of claim 11, wherein a first gap is formed between the horizontal portion of the flexure limiter and the load beam in a vertical direction, and a second gap is formed between the horizontal portion of the flexure limiter and each sidewall of the load beam in a horizontal direction.

14. The actuator of claim 13, wherein the first gap and the second gap are determined within a range between a minimum value at which smooth rolling and pitching of the slider is secured and a maximum value at which a deformation of the rectilinear monomember flexure and a collision with the slider is prevented.

15. The actuator of claim 11, further comprising another flexure limiter, wherein each flexure limiter is proximate to an edge of the front end portion of the rectilinear monomember flexure.

16. The actuator of claim 15, wherein the two flexure limiters are spaced in a width direction of the rectilinear monomember flexure to limit a twist angle θ to a size greater than an angle at which a smooth rolling of the slider is secured and smaller than an angle at which deformation of the rectilinear monomember flexure occurs.

17. The actuator of claim 15, wherein the flexure limiters are spaced sufficiently far apart in a width direction of the rectilinear monomember flexure to provide a twist angle θ that is limited to a size that is below a predetermined limit even when the rectilinear monomember flexure is twisted due to a horizontal shock.

18. The actuator of claim 15, wherein the load beam limits an upward movement of an end of the rectilinear monomember flexure, and each flexure limiter limits a downward movement of another end of the rectilinear monomember flexure.

* * * * *